United States Patent [19]
Korpel et al.

[11] 3,890,829
[45] June 24, 1975

[54] METHOD AND APPARATUS FOR ACOUSTICAL IMAGING

[75] Inventors: Adrianus Korpel, Prospect Heights; Robert L. Whitman, Oak Park, both of Ill.

[73] Assignee: Zenith Radio Corporation, Chicago, Ill.

[22] Filed: Apr. 11, 1973

[21] Appl. No.: 350,276

[52] U.S. Cl. .............................. 73/67.5 H; 340/5 H
[51] Int. Cl. ............................................ G01n 29/04
[58] Field of Search.......... 73/67.5 R, 67.5 H, 67.7, 73/67.8 S, 67.9; 340/5 H, 5 MP; 178/DIG. 18

[56] References Cited
UNITED STATES PATENTS

| | | | |
|---|---|---|---|
| 3,585,848 | 6/1971 | Korpel | 73/67.5 H |
| 3,600,935 | 8/1971 | Baum | 73/67.5 H |
| 3,745,814 | 7/1973 | Gabor | 73/67.5 H |

*Primary Examiner*—Richard C. Queisser
*Assistant Examiner*—John P. Beauchamp
*Attorney, Agent, or Firm*—John H. Moore

[57] ABSTRACT

A method and apparatus for acoustical examination of a specimen, in which the specimen is insonified with a low-duty-cycle, high-frequency acoustical pulses, acoustical energy reflected from or transmitted through the specimen impinging upon an image plane. A transducer scans the image plane at a velocity coordinated to the arrival in the image plane of energy from points, successively insonified, in an object plane intersecting the specimen. The transducer generates an electrical signal representative of acoustic properties of that portion of the specimen coincident with the object plane; the object plane can be displaced by varying the timing of initiation of the transducer scan and can be angularly displaced by adjusting the scanning speed.

8 Claims, 9 Drawing Figures

METHOD AND APPARATUS FOR ACOUSTICAL IMAGING

BACKGROUND OF THE INVENTION

Pulse-echo systems of acoustic visualization have been proposed, in which an object is scanned with acoustical pulses originating from a transducer that also serves as a receiver for sound energy which is reflected directly back from the object under study. The received signal modulates a display which is scanned in a direction corresponding to the transmitted acoustic pulse scan. In a system of this kind, transverse resolution in any one direction for the display scan is determined by the beam width, generally several acoustic wave lengths, and depth resolution is determined by the pulse duration, often approaching one wavelength of the sound. Thus, any reflecting object smaller than the beam width is recorded, during any one scan, as a line as wide as the sound beam and approximately one wavelength thick. For better image resolution, the transducer may be "rocked" in any one position as well as being moved to various positions circumferentially around the target. The scan direction of the display is set to correspond to each new transmitted pulse direction, generating many overlapping lines centered about the actual position of the reflecting object.

A pulse echo system of this kind presents a number of difficulties and disadvantages. Because many illumination angles are necessary for good transverse resolution, the picture of any one cross section requires a substantial period of time in formation. A volume picture, comprising several cross sections, takes even longer to form. A storage tube must be used in the display, so that dynamic range suffers. Furthermore, the signal-to-noise ratio may be relatively poor and the solid angle of collection is undesirably small. False signals may be developed, due to multiple reflections, and pulse stretching may occur with a target that is inclined to the direction of transmission; strong multiple reflections from the transducer may limit the scanned depth obtainable with the system.

Acoustic imaging systems have also been developed, in which transmitted or reflected sound from an object under study is imaged by an acoustic lens on some plane where it can be detected. A system of this kind affords a real time picture of the object plane, with good resolution. Scatterers in the illuminated volume appear as out of focus images, allowing information about the volume of the specimen under study to be obtained instantly. Different cross-sections can be brought into focus by moving the object under study or by moving the lens. A gray scale is possible because no storage tube is required and the lens is frequently able to gather more of the scattered sound than is possible with only a transducer.

Such acoustic imaging systems, however, still present some definite problems. The out-of-focus images of scatterers may interfere with or may confuse the picture of the image plane. For reflected sound, one angle of illumination may not be reflected into the lens aperture by a specularly reflecting target. If several beams are necessary, the signal must be dropped in each beam, thus reducing the signal-to-noise ratio for certain objects. Because continuous wave insonification is used, spurious signals from water tank reflections and the like are more prevalent than in a pulse system.

SUMMARY OF THE INVENTION

It is a principal object of the present invention, therefore, to provide a new and improved method and apparatus for acoustical examination of a specimen that provides the depth resolution of a pulse-echo system without incurring the attendant disadvantages discussed above.

A specific object of the invention is to provide a new and improved method and apparatus for acoustical examination of a specimen that affords a real time picture with good resolution and that substantially minimizes or eliminates the effect of out-of-focus images not located in the desired image plane.

Another object of the invention is to provide a new and improved method and apparatus for acoustical examination that permits the use of higher insonification levels with resultant improved efficiency in operation of the system.

Another object of the invention is to provide a new and improved method and apparatus for acoustical examination that incorporates effective and convenient techniques for adjusting the level of an object plane, within an object under study, and also for readily adjusting the angular orientation of the object plane without requiring physical displacement of the specimen under study.

Accordingly, the invention relates to a method of acoustically inspecting a specimen. The specimen is pulse-insonified with a series of periodically repetitive pulses of high frequency acoustic energy propagated along a given insonification path, the duration of each acoustic pulse being very much shorter than the pulse repetition period. An image plane, disposed at a given angular relation to the insonification path, is scanned with an acoustical-electrical output transducer to intercept acoustic energy from the specimen and develop an electrical signal characteristic of the acoustic properties of the specimen along a desired object plane intersecting the specimen. The scanning transducer is synchronized in velocity and position with energy arriving at successive points in the image plane from points successively insonified by the acoustic pulse in the object plane.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

DESCRIPTION OF THE PREFERRED EMBODIMENT

Figure 1:
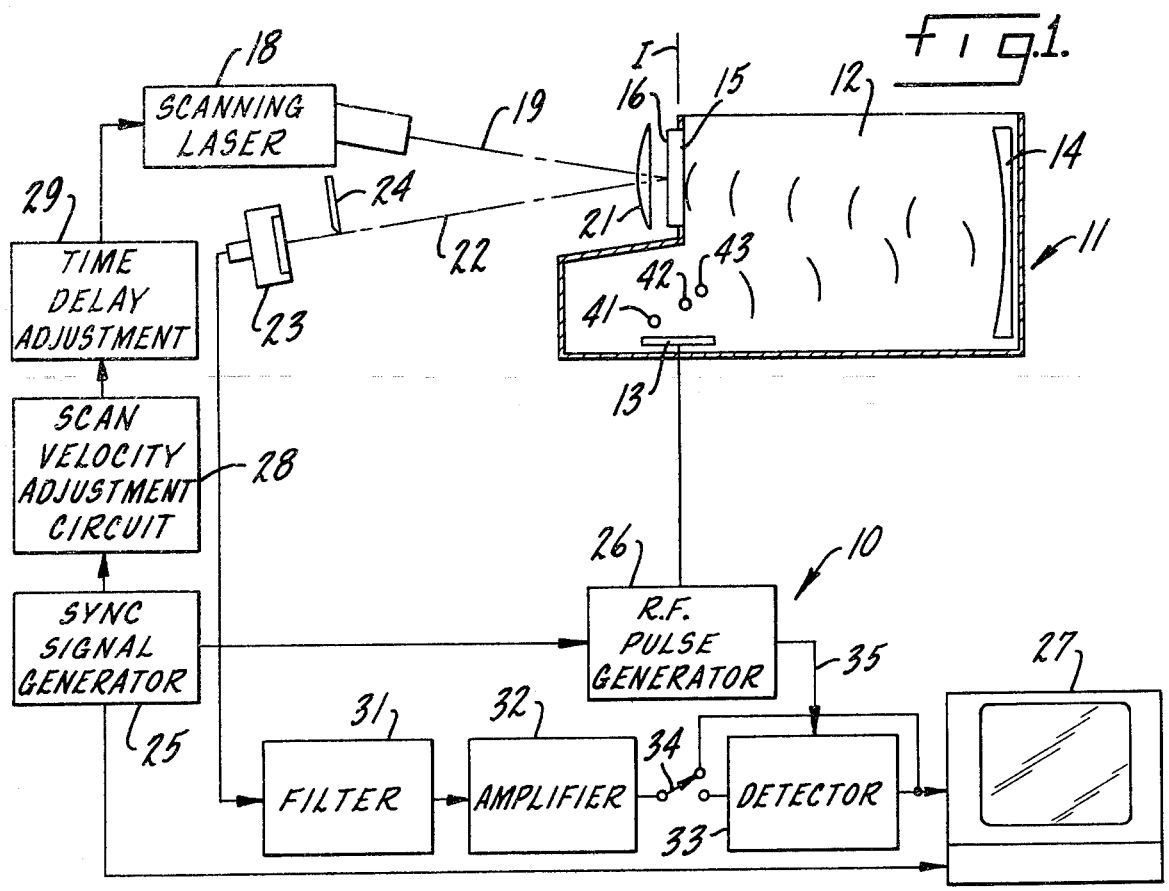
FIG. 1 is a schematic illustration of an apparatus for real-time depth-gated acoustic image holography, constructed in accordance with one embodiment of the present invention.

The acoustical camera 10 illustrated in FIG. 1, which provides for examination of a specimen with substantial magnification, comprises an insonification cell 11 filled with a fluid sonic propagation medium. In the illustrated system, the sonic propagation medium 12 may comprise water.

An electro-acoustical transducer 13 is positioned within cell 11, at one end of the cell. A sonic reflector 14 is located at the opposite end of cell 11. In the illustrated system, the sonic reflector 14 is a spherical brass mirror having a focal length of approximately 200 millimeters. At the end of the cell 11 opposite reflector 14, but displaced from transducer 13 by a substantial distance, an image plate 15 is mounted in the wall of the cell. Plate 15 is preferably formed of a resin having an acoustic impedance which can be reasonably matched with that of the water or other fluid propagation medium 12 in the cell. Suitable materials for image plate 15 include polymethylmethacrylate and polycarbonate resins. One surface 16 of the image plate 15 has a thin coating of gold or other highly reflective metal, affording an efficient mirror for a high intensity light beam impinging upon the outer surface of the face plate.

A scanning laser 18 is incorporated in the acoustical camera 10 illustrated in FIG. 1, developing a high intensity, phase-coherent light beam that is directed toward and focused upon the resin face plate 15 along a path 19. A suitable lens system, generally indicated by a single lens 21, is provided for directing the reflected beam from the image plate along a path 22 toward a photodetector 23. A knife edge detector element 24 is located along path 22 with the knife edge coincident with the center of the reflected beam 22.

A synchronizing signal generator 25 is incorporated in the system of FIG. 1 and is connected to the laser source 18 through a velocity adjustment circuit 28 and a time delay adjustment circuit 29 to control scanning movements of the laser beam. The synchronizing signal source 25 is also connected to a radio frequency pulse generator 26 that develops a high frequency electrical signal. By way of example, the output frequency for pulse generator 26 may be 2.268 MHz. It is this signal that is applied to transducer 13, yielding an acoustic wavelength of 0.66 millimeters in the water medium 12 employed in the sonic cell 11. The synchronizing signal source 25 is also connected to a television monitor 27 that is employed as an image display device in system 10.

The photodetector 23 of system 10 has its output connected to a filter 31. The output of filter 31 is coupled to an amplifier 32. The output from amplifier 32 is connected to an input to television monitor 27 to supply a video signal to the image reproducer. A phase detector or amplitude detector 33 may be incorporated in the circuit intermediate amplifier 32 and image reproducer 27, by means of a switch 34, in some instances. If detector 33 is a phase detector, then an electronic continuous phase reference signal is fed into the detector from the R.F. source in circuit 26 as indicated by conductor 35.

In FIG. 1, three test objects 41, 42 and 43 are shown mounted within cell 11 in front of the input transducer 13. In operation of the system, pulse generator 26 is actuated, by the synchronizing signal from source 25, to produce a single brief high-frequency pulse for each scanning line in operation of image reproducer 27. The same scanning signal from source 25 that controls generator 26 and image reproducer 27 is also applied to the laser 18 to afford a controlled laser scanning rate covering an area 80 millimeters wide by 60 millimeters high. Thus, the 53 microsecond horizontal scan time for the system 10 provides a laser scan velocity of 1.5 $\times 10^6$ millimeters per second, matching the speed of sound in water as required for synchronism with the illustrated arrangement of broadside insonification and 1:1 imaging. Strictly speaking, in this single lens system, sound does not take equal time in traveling from each point in a flat object plane to equal points in a flat image plane. Rather, the gating defines an object plane that has a slight curvature. However, for an object plane of the stated dimensions and with a focal length as specified above, the gated object plane deviates by only a few millimeters from a flat object plane.

In system 10, three metal rod specimens 41-43, each 6.3 millimeters in diameter, are arranged near the image plane I, which is essentially coincident with the object plane 0, with the geometry illustrated in FIG. 2A. FIG. 2B shows the display developed on image reproducer 27 if the rods 41-43 are insonified by a continuous acoustic field at 2.268 MHz with a power density of 0.13 watts per square centimeter, utilizing a 50 $\times$ 50 millimeter quartz transducer as the transducer 13 (FIG. 1). As shown in FIG. 2B, the reflected field from the first specimen affords an image 41A that overlaps and interferes with the image 42A from rod 42. Even more intense interference effects are seen between the images 42A and 43A of specimens 42 and 43.

When pulse generator 26 is actuated to produce output pulses of six microsecond duration, with a pulse repetition period of 53 microseconds, the resulting pulse sound field affords a depth resolution of nine millimeters. This permits resolution of the reflections from the three specimen rods without interference. The time delay adjustment 29 between the acoustic pulse generator, comprising the RF generator 26 and the input transducer 13, and the scanning laser 18 allows the different cross sections of the object field to be displayed separately as shown by the images 41B, 42B and 43B in FIGS. 2C, 2D and 2E, respectively. The actual displays each exhibit a series of fine vertical lines that are representative of phase information pertaining to the objects 41-43, the display actually constituting an image plane hologram.

At the stated frequency of 2.268 MHz, the theoretical transverse resolution of the acoustical camera 10 illustrated in FIG. 1 is limited to approximately two millimeters by the characteristics of the liquid-solid surface sound detection system. The depth resolution depends upon the insonifying pulse duration. It is thus seen that this acoustic camera combines the depth resolution of a pulse-echo system with the transverse resolution of an imaging system. The gating action of the scanning laser beam largely eliminates spurious images from objects displaced from the plane actually being examined. Furthermore, display of a desired cross section is obtainable in a real time system and phase information is retained in the image.

Figure 3:
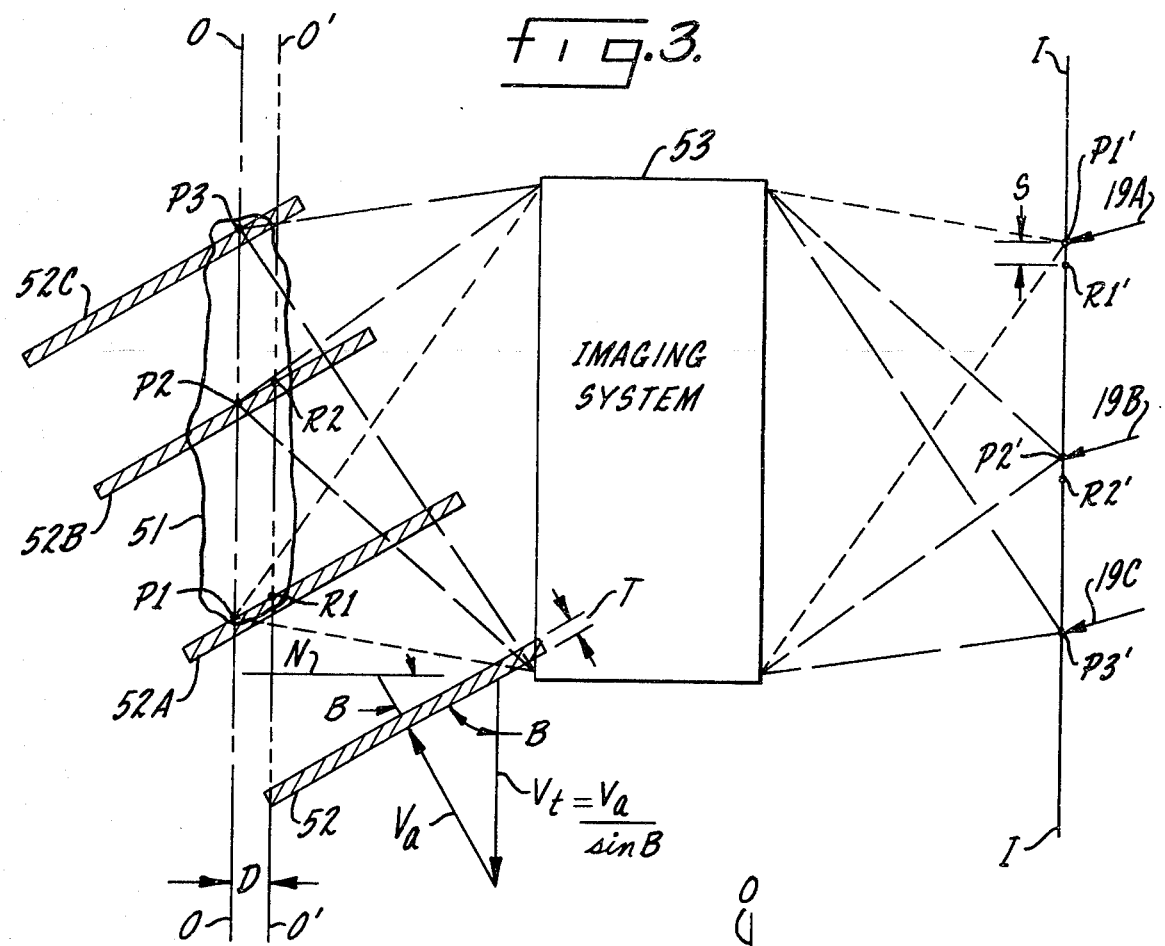
FIG. 3 is a schematic diagram of another acoustical examination system, similar to FIG. 1, illustrating a technique for selection of a given object plane.

For a more detailed consideration of the method of the present invention, as employed in the system of FIG. 1 and in other systems utilizing the principles of the invention, reference may be made to the schematic illustration of FIG. 3. A specimen 51 is immersed in a suitable tank or cell filled with a fluid sonic propagation medium (not shown); ordinarily, the sonic propagation medium is a liquid, although in very special cases a gas may be employed. A short, high-frequency acoustical pulse 52, in the form of a plane wave, is launched toward the specimen 51 along a given path, at a velocity $V_a$, the insonification path having an angle B with respect to the normal N to an object plane 0 transecting the specimen 51.

When the plane wave sound pulse reaches a position 52A, sound scattered by the point scatterer element P1 of the specimen 51 is imaged by an imaging system 53 onto a point P1' in an image plane I. The image plane I may be considered to represent the surface of the face plate 15 in an imaging system of the kind illustrated in FIG. 1. Because an image is formed, all paths between points P1 and P1', through imaging system 53 and the encompassing fluid propagation medium, are equal in the sense that it takes the sound equally long to travel from the one point to the other. Moreover, it may be assumed that the same condition applies for additional points P2 and P3 on the object plane 0 intersecting the specimen 51. That is, the acoustical travel time from point P2 in plane 0 to point P2' in the image plane I is substantially equal to the travel time from point P1 to point P1'. At least, object and image planes may be identified for which this relationship holds true. As noted above, the image and object planes are not necessarily flat; they may have appreciable curvature, depending upon the nature of the imaging system 53.

For simplicity, it may be assumed that the magnification afforded by imaging system 53 is unity, so that the distance between points P1 and P2 is equal to the distance between points P1' and P2' and the distance between points P2 and P3 is equal to the distance between points P2' and P3'. Additionally, it may be assumed that the speed of propagation of acoustic energy in the specimen 51 is substantially equal to that in the liquid or other fluid propagation medium that encompasses the specimen.

For these conditions, it is readily seen that the disturbance caused by the acoustic pulse 52, in the object plane 0, moves upwardly from position 52 through positions 52A, 52B and 52C, with a velocity $V_t$, determined in accordance with the equation:

(1) $$V_t = \frac{V_a}{\sin B},$$

where $V_a$ is the acoustic velocity in the propagation medium. Thus, if the point P1 is imaged at a time T1, then the next point P2 will be imaged at a time T2 determined in accordance with the relationship (2) $$T2 - T1 = \frac{\text{Distance P1 to P2}}{V_a}(\sin B).$$

The scanning action of the output transducer comprising the laser beam 19 (FIG. 1) can now be envisioned. If the laser beam starts at the point 19A at the time the point P1 in the specimen 51 is imaged at point P1' in the image plane I, the laser beam should be synchronized in its movement, scanning downwardly across the image plane I, at a velocity $V_t$ equal to the upward velocity of the sound pulse in object plane 0. Under these circumstances, the scanning beam arrives at position 19B at the time when sound energy representative of the specimen point P2 is imaged at point P2' in the image plane I. Furthermore, the laser beam reaches position 19C in synchronism with continuing insonification of the object plane in the specimen, scanning point P3' in the image plane at the same time that the reflected acoustical energy reaches that point from point P3 in the specimen. Thus, the output transducer represented by the scanning laser beam is maintained in synchronism with the insonifying pulse 52 as it passes through positions 52A, 52B and 52C and correctly samples the image of the entire object plane 0. Of course, this process is repeated many times, with the sampling transducer displaced incrementally in a direction perpendicular to the plane of the drawing, in order to complete a full surface image of the object plane 0.

Consideration may now be given to a plane 0' located closely adjacent to plane 0 and intersecting a part of specimen 51. With conventional continuous insonification, the image of plane 0' would also appear at the image plane I and would be picked up by the output transducer comprising the scanning laser beam. The image of plane 0' would be slightly out of focus, depending upon the depth of field of the system and the displacement between the two planes 0 and 0'. Thus, at the same time that the insonifying pulse 52 reaches its position 52A coincident with point P1 in plane 0, it also reaches a point R1 in plane 0'. The image R1' (which may be slightly out of focus) is formed slightly later than the image point P1'. In any event, it arrives at the image plane I too soon to be picked up by the scanning transducer comprising the laser beam, if the insonifying pulse 52 is assumed to be infinitely short. This reasoning holds true for any plane other than the object plane 0, assuming an infinitely short insonifying pulse. Thus, for this condition, the plane 0 is the only plane whose image is developed in the output of the scanning transducer.

Actually, of course, the insonifying pulse 52 is of finite duration. If the actual duration of the sonic pulse is T, then the effective pulse length is $V_a \times T$. In considering the finite length of the pulse, for the sake of simplicity, it may be considered that the angle B is 90°, which is actually the case in the apparatus illustrated in FIG. 1. For these circumstances, the points R1' and P1' are effectively coincident in space. It is readily seen that these two images, therefore, overlap in time whenever the distance D between the object planes 0 and 0' is equal to or less than the pulse length $V_a \times T$. Accordingly, this value of the object plane spacing D determines the depth discrimination for the system.

The timing of the laser beam scan must, of course, be such that it arrives at the location P1' when the sound that is scattered by point P1 arrives at the image plane I. If the transducer sampling occurs earlier or later in time, the effect will be that the image of some plane other than the plane 0 will be sampled. Accordingly, by changing the initial timing (position) of the transducer, but not the speed, other planes such as the plane 0' may be selected for examination. In general, these planes may appear somewhat out of focus, but as the scanning transducer can sample phase as well as amplitude, the image may be a hologram that can be reconstructed for proper focusing.

If the angle B is not equal to 90°, as in the example illustrated in FIG. 3, the situation is somewhat more complex. Not only will the radiation from point R reach the image plane point R1' sooner than the radiation from point P1 reaches the image plane point P1' but also points P1' and R1' do not coincide in space. In fact, they are separated by a definite distance S in the image plane, as illustrated in FIG. 3. If point R1 is to be sampled, the pulse width must be such as to cover not only the delay in the sound arrival time but also the delay in arrival time of the scanning transducer. It may be shown that for point R1' to be sampled, the following relation must obtain:

(3) $$\frac{D}{V_a}(1 + \cos B) < T.$$

From the foregoing description, it is apparent that the depth discrimination of the system improves in general with decreasing values for the angle B. However, this is subject to the limitation that the required scanning speed increases so that if angle B is reduced to zero, the scanning speed becomes infinite. This would correspond to taking an instantaneous snapshot of the complete acoustic field, and cannot be accomplished. The angle B must be of a definite value substantially different from zero. If the sound pulse is incident from the left-hand side of the specimen, as viewed in FIG. 3, the term cosine B becomes negative and the depth discrimination decreases to zero when the angle B equals 180°. In general then, the system will minimize the generation of out-of-focus images which otherwise could interfere with or confuse the picture at the imaging plane. Moreover, this pulse system is equally effective to minimize or eliminate spurious signals from reflections off of the walls of the sound cell and from other sources.

The pulsed insonification arrangement of the invention produces a sound image that is "painted" on the image plane I with a transversely moving beam of sound. This sonic picture can be detected by a scanning laser beam, as described. Alternatively, the output transducer could consist of an electronic commutation system coupled to a mosaic of minute receiving transducers or might even constitute a single minute receiving transducer moved mechanically along the image plane, although the latter technique imposes severe mechanical problems.

For scanning rates of the kind utilized in conventional television monitors and similar image reproducing equipment, the output transducer may scan a single line in a time interval of about 53 microseconds. During this period, assuming that the fluid sound propagation medium is water, the sound pulse 52 will move a distance of 79.5 millimeters. If the scanning transducer can produce a total of 53 resolvable points, the operation is equivalent to scanning any given image point over a time interval of approximately one microsecond. For these conditions, sound from scattering points that are displaced from the object plane by no more than 1.5 millimeters are the only points that will be detected; that is, the depth of field for the system is limited temporally to 1.5 millimeters, assuming that a pulse duration of less than one microsecond is employed.

The system of the present invention may be viewed as a modified pulse-echo system rather than a modified imaging system. This is a pulse-echo system, then, that looks at transversely reflected or scattered sound instead of being based upon sound which is reflected directly back to a transmitter. The system is capable of gathering sound from a much wider solid angle than in a standard system utilizing no lens. It has a resolution in depth that is determined by the system pulse time, as in a conventional pulse-echo arrangement, but the transverse resolution is determined by the imaging system, with some possible improvements due to the pulse insonification, and is of the same order as the depth resolution without requiring storage or multiple scans. In addition, the method and system of the invention provide for gated reception for every image point because of the synchronous scanning technique employed for the output transducer. This effectively eliminates the errors due to multiple reflections that are common to more conventional pulse systems. Maximum information is gathered, for any one illumination position, with a minimum of false targets.

Figure 2:
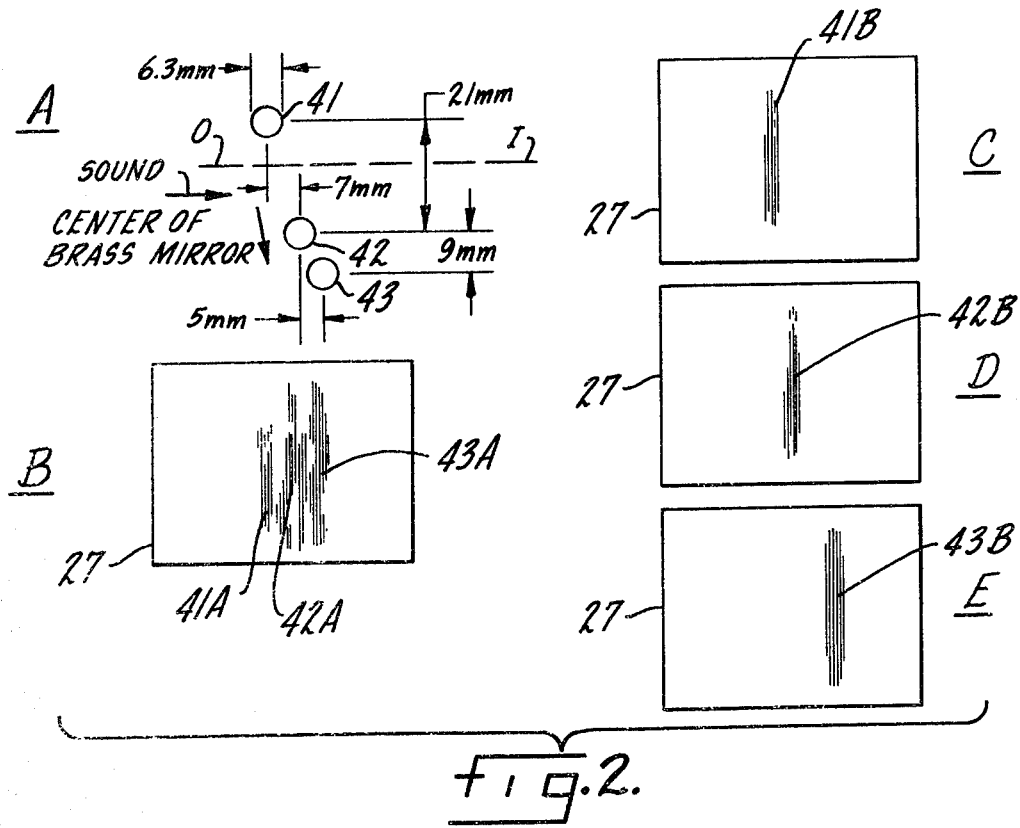
FIGS. 2A through 2E illustrate the object geometry and the images derived from the system of FIG. 1.

As thus far described, in connection with FIGS. 1-3, the method and system of the invention apply to operation in a reflection mode, or a transmission mode, with sound incident upon the object under examination at angles from a direction parallel to the object plane to angles nearly perpendicular to the object plane. As noted above, the technique cannot be successfully applied with the insonification angle aligned normal to the object plane because the required scanning frequency for the output transducer would be infinite. For biological specimens, on the other hand, the reflection mode of operation actually illustrated in FIGS. 1-3 is not particularly desirable because very little of the insonifying energy may actually be reflected from the specimen.

Figure 4:
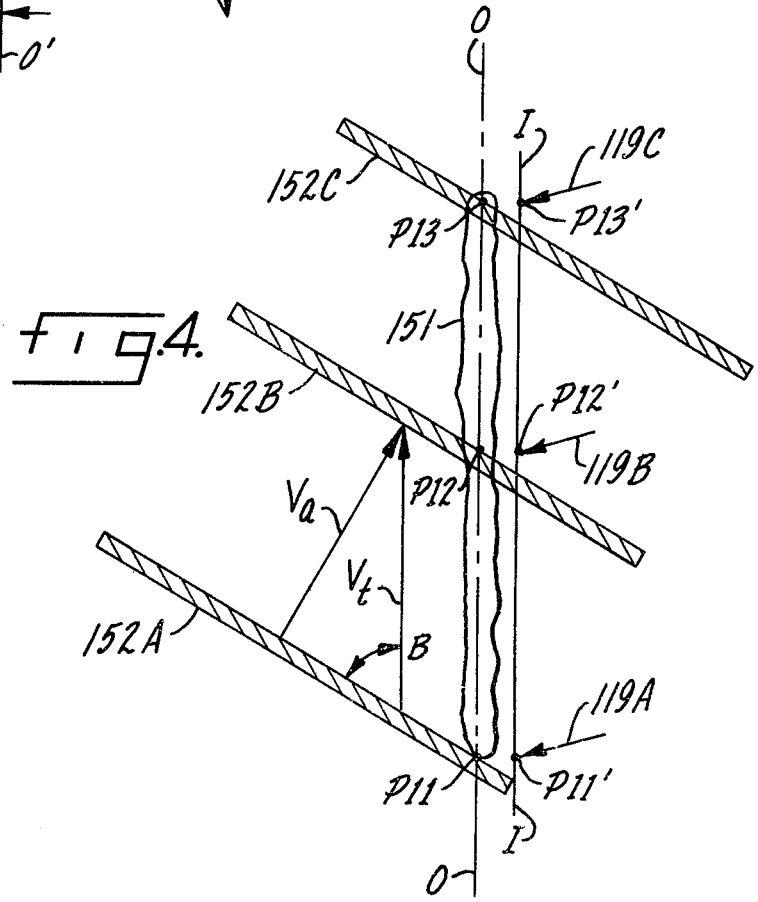
FIG. 4 is a schematic diagram, similar to FIG. 3, for a system according to the invention, utilizing transmission techniques rather than reflection techniques.

FIG. 4 illustrates the application of a similar technique to a specimen 151, which may be a biological specimen, utilizing a lensless transmission mode of operation. In the system shown schematically in FIG. 4, the specimen 151 may be assumed to be immersed in a fluid sonic propagation medium and is positioned immediately adjacent an image plane, which may be a sonically deformable face plate like the image plate 15 of FIG. 1. The specimen 151 is insonified with a low-dutycycle pulse of high frequency acoustical energy, moving through the propagation medium along a path and with a velocity $V_a$. The sonic pulse is shown at three sequential positions 152A, 152B and 152C.

When the sonic pulse is at the position 152A, it impinges upon a point P11 in specimen 151, producing an image at the image plane I at point P11'. When the pulse reaches the position 152B, the transmission from the point P12 in the specimen introduces a reaction at point P12' in the image plane I. Similarly, when the sonic pulse reaches position 152C, energy is directed from the object point P13 to the image plane I at the point P13'. These images developed at points P11', P12' and P13' are interpreted by an output transducer moving in synchronism with the acoustic pulse, as generally indicated by the interrogating beam or other transducer positions 119A, 119B and 119C.

The images obtained with the arrangement illustrated in FIG. 4 are not effectively depth gated in the full sense of the previously described reflection mode arrangement. Moreover, this "lensless" system forms, more or less, a shadow image in which the resolution is not as good as can be attained with an imaging system. However, the system does afford the same increase in insonifying power that is possible with the reflection mode operation. This high duty factor pulse capability is of substantial advantage, in comparison with at least some previously known systems, and affords a substantial improvement in the examination of biological structures.

Figure 5:
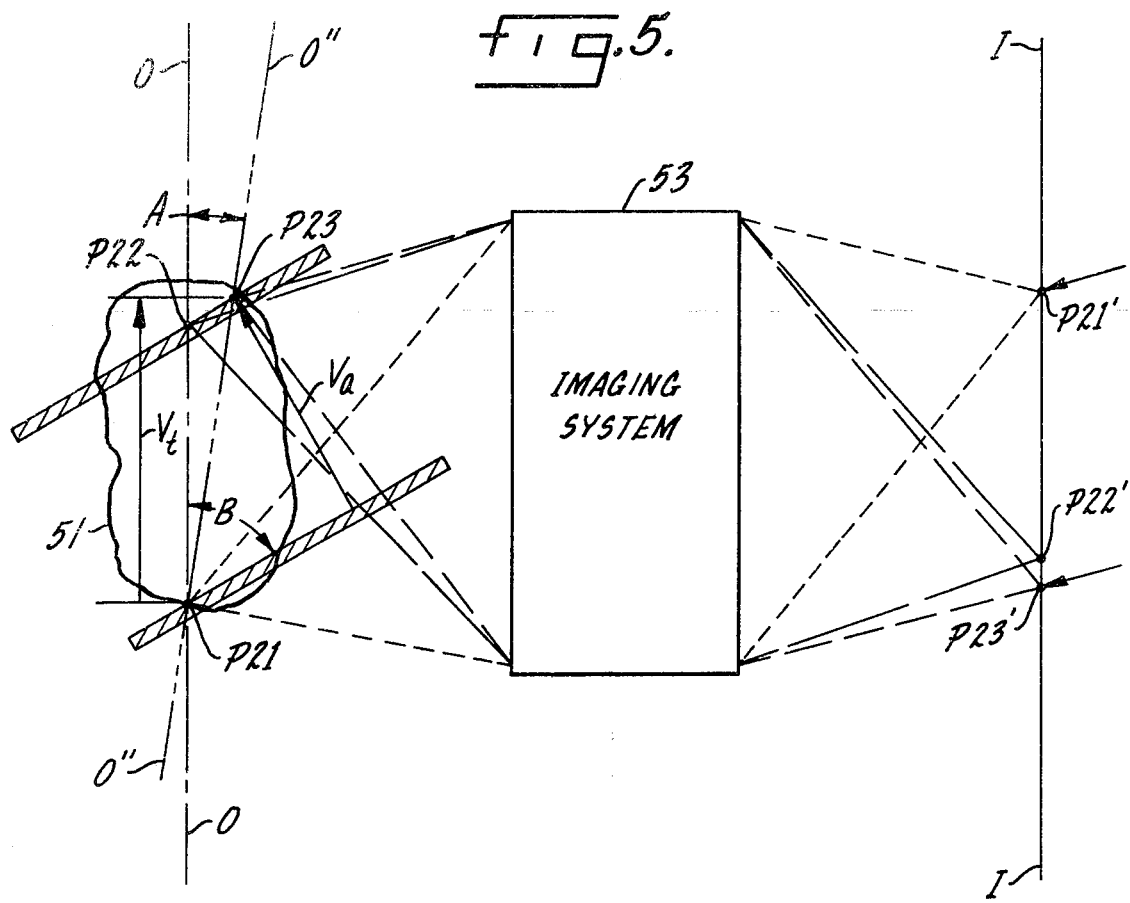
FIG. 5 is a schematic illustration, similar to FIG. 3, employed to illustrate a technique for angular displacement of the object plane in the examination of a specimen.

FIG. 5 illustrates another reflection mode arrangement, corresponding to that of FIG. 3, operated with a transducer scanning speed significantly different from the scanning velocity postulated in connection with the previous figures. In FIG. 5, the plane 0 is parallel to the image plane I. If the scanning speed were determined on the basis of equation (1), for parallel object and image planes, the system would develop an acoustical image of the successive points P21 and P22 lying on the plane 0.

In the operation of the system illustrated in FIG. 5, however, the transducer scanning velocity $V_t$ is determined in accordance with the equation $$(4) \qquad V_t = \frac{V_a \cos A}{\sin (B-A) - \sin A},$$

in which $V_a$ is again the acoustic propagation velocity along the insonification path, B is the angle of intersection between the insonification path and the normal to the image plane, and A is the angle of inclination between the image plane and an actual object plane $0''$. It can be seen that equation (1) is simply a special case for equation (4) with the angle A equal to zero, denoting parallel object and image planes.

With the transducer moving along the image plane I at the velocity $V_t$, it can be shown that the points in the object 51 that are imaged are actually the points P21 and P23 in the plane $0''$ instead of points P21 and P22 in plane 0. Further variation in the scanning rate of the output transducer can be employed to increase or decrease the angle A, changing the angular orientation of the object plane $0''$ to a substantial extent on either side of the nominal object plane 0. This is the purpose of the scan velocity adjustment circuit 28 (FIG. 1).

With the foregoing systems, because no sound power scattered from the object plane is ever in the image plane without being sampled at least in one dimension, operation is substantially more efficient than with a non-pulsed system. For the same average power, the sensitivity can be increased in accordance with the ratio of the repetition period of the sonic pulses to the pulse duration. For the parameters set forth above in connection with FIG. 1, this ratio is 53/6, indicating a sensitivity increase of about 9:1. Because of the usual range of sound velocities, the systems do not readily lend themselves to slow scanning applications. Furthermore, sensitivity cannot be increased by reducing the scanning rate, since this merely changes the angular orientation of the object plane as discussed above (FIG. 5). On the other hand, successive scans can be integrated, thus partially canceling the noise; a delay line arranged as a comb filter may be employed for this purpose.

We claim:

1. The method of acoustically inspecting a specimen in a sonic propagation medium comprising the following steps:
    pulse-insonifying the specimen with a series of periodically repetitive pulses of high-frequency acoustic energy propagated along a given insonification path so as to generate reflected acoustic waves in the sonic medium from points on the specimen lying in a predeterminable object plane, the direction of the insonification path being chosen such that the angle formed between the insonification path and the normal to the object plane is substantially greater than zero, and the duration of each acoustic pulse being very much shorter than the pulse repetition period;
    receiving the reflected waves at an image plane having a predetermined angular displacement other than normal from the insonification path;
    scanning the image plane with a transducer to intercept acoustic energy from the specimen and develop an electrical signal characteristic of the acoustic properties of the specimen along a desired object plane intersecting the specimen; and
    synchronizing the velocity and location of the scanning with energy arriving at successive points in the image plane from points successively insonified by an acoustic pulse in the object plane.

2. The acoustic inspection method of claim 1, in which the transducer scanning velocity $V_t$ corresponds to $$V_t = \frac{V_a \cos A}{\sin (B-A) - \sin A},$$

where $V_a$ is the acoustic propagation velocity along the insonification path, B is the angle of intersection between the insonification path and the normal to the image plane, and A is the effective angle of inclination between the image plane and the object plane.

3. The acoustic inspection method of claim 1, in which the acoustical pulses impinge upon the specimen from the side of the specimen effectively facing the image plane, so that the energy intercepted by the output transducer is energy reflected from the specimen.

4. The acoustical inspection method of claim 1, in which the acoustical pulses impinge upon the specimen from the side opposite that effectively facing the image plane, so that the energy intercepted by the output transducer is energy transmitted through the specimen.

5. The acoustic inspection method of claim 1, in which the ratio of the scanning repetition period to the pulse duration period is of the order of about 9:1 or more.

6. An acoustical camera comprising:
    pulse-insonification means for applying a series of periodically repetitive pulses of high-frequency acoustical energy to a specimen lying in an object plane, each pulse being propagated along a given insonification path to impinge upon the specimen, the duration of each acoustic pulse being very much shorter than the pulse repetition frequency and the direction of the insonification path being chosen such that the angle formed between the insonification path and the normal to the object plane is greater than zero;

receiving means located at an image plane and acoustically coupled to the specimen for intercepting acoustic energy from the specimen impinging upon the image plane, said image plane having an angular displacement other than normal from the insonification path and scanning means for scanning the receiving means in synchronism with energy arriving at successive points in the image plane from points successively insonified by an acoustic pulse in the object plane, and for developing an electrical signal representative of the acoustic properties of the specimen along the object plane the scanning being effected at a velocity $V_t$ determined in accordance with the relationship $$V_t = \frac{V_a \cos A}{\sin (B-A) - \sin A}$$

where $V_a$ is the acoustic propagation velocity along the insonification path, B is the angle of intersection between the insonification path and the normal to the image plane, and A is the angle of inclination between the image plane and the object plane.

7. An acoustical camera according to claim 6, and further comprising means to adjust the scanning velocity $V_t$ to vary the angle of inclination A between the image plane and the object plane.

8. An acoustical camera according to claim 6, and further comprising means to adjust the timing of the start of each scanning line to control the depth of the object plane in the specimen.

* * * * *